United States Patent
Borioli et al.

(10) Patent No.: US 6,407,394 B1
(45) Date of Patent: Jun. 18, 2002

(54) PROCEDURE TO MEASURE THE RADIOACTIVITY OF RADIOACTIVE MATERIAL ENCLOSED IN A CONTAINER

(75) Inventors: Enrico Borioli, Legnano; Alessandra Cesana, Busto Arsizio; Giancarlo Sandrelli, Saronno; Mario Terrani, Gorgonzola, all of (IT)

(73) Assignee: ENEL S.p.A., Rome (IT)

( * ) Notice: Subject to any disclaimer, the term of this patent is extended or adjusted under 35 U.S.C. 154(b) by 0 days.

(21) Appl. No.: 09/367,238
(22) PCT Filed: Mar. 6, 1998
(86) PCT No.: PCT/EP98/01318
§ 371 (c)(1), (2), (4) Date: Oct. 7, 1999
(87) PCT Pub. No.: WO98/43115
PCT Pub. Date: Oct. 1, 1998

(30) Foreign Application Priority Data

Mar. 21, 1997 (IT) .......................................... MI97A0659

(51) Int. Cl.$^7$ ................................................ G01T 7/00
(52) U.S. Cl. ...................................... 250/395; 250/394
(58) Field of Search .................................. 250/395, 394

(56) References Cited

U.S. PATENT DOCUMENTS 5,135,706 A * 8/1992 Costes et al. ............... 376/245

FOREIGN PATENT DOCUMENTS

| EP | 0208 250 A2 | 1/1987 |
| EP | 0667 539 A1 | 8/1995 |

* cited by examiner

Primary Examiner—Constantine Hannaher
(74) Attorney, Agent, or Firm—Keil & Weinkauf

(57) ABSTRACT

A procedure having the steps of: weighing a known volume container (4) in order to determine the average density of its content; positioning the container (4) upon a support (1); positioning on respective supports (5) two γ ray detectors (6) set symmetrically to the container; causing vertical movement (F2) of the container, so that its main longitudinal axis coincides with the axis (I—I) connecting the two detectors (6); causing movement (F1) of the two detectors upon their respective supports in order to stop them in a first tentative position; causing movement (F1) of the two detectors in order to stop them in a second symmetrical position that proves to be suited to providing countings of the radiations that are an optimum; measuring the γ radiation and calculating the geometric mean of the counting ratios of the two detectors, such a geometric mean being linked to the intensity (I) of the corresponding γ radiation by a formula (1-2) from which the radiation intensity is calculated.

2 Claims, 1 Drawing Sheet

PROCEDURE TO MEASURE THE RADIOACTIVITY OF RADIOACTIVE MATERIAL ENCLOSED IN A CONTAINER

FIELD OF THE INVENTION

The present invention concerns a procedure to measure the radioactivity of radioactive material enclosed in a container, more especially to measure the radioactivity due to radioactive sources and/or active or contaminated materials set within a sealed container.

During the performance of activities in the nuclear field (power stations, research laboratories, analysis laboratories, etc.) a considerable quantity of weakly radioactive solid wastes are produced that are normally gathered in containers that are then sealed. In order to correctly manage these wastes it is necessary to be able to rapidly and reliably check the nature and extent of the contamination present.

Because we are dealing with sealed containers, the only technique applicable is that of externally measuring the γ radiation, from which, by means of appropriate calculations, it is possible to achieve the overall contamination a α+β+γ.

The main problem in the interpretation of the results of the γ measurements is the assessment of the reliability of the survey, owing to the fact that the sources are of large dimensions within which both the distribution of nature of the materials and the distribution of the activity is widely unknown.

DESCRIPTION OF THE RELATED ART

At the state of the art, the assessment of activity is generally conducted by means of the γ count in various lateral positions outside the container based on the hypothesis that the contents feature a homogeneous composition and that the distribution of activity is known, or else by means of the γ dose measurement performed along the sides of the container, measurements from which one then finds the value of the source activity by means of appropriate calculation procedures.

Document JP 60 076680 A is known that discloses a surface dose rate measuring apparatus wherein a drum-shaped object to be measured is rotated and moved up-and-down so as to be opposed to two surface dose rate detectors, each provided with a shielding element that shields radiations from the undesired directions and moved in relative relation to the other one, the maximum radiation value being efficiently determined at time of scanning due to the detectors relative movement.

SUMMARY OF THE INVENTION

Laboratory measurements conducted on containers originating from nuclear power stations, some of which contained exhausted ion exchange resins and others with technological wastes, have shown differences also in excess of twice the values of activity calculated with such techniques and those of the true activity, as a consequence, the criteria for radiation protection adopted in the handling and storage of low specific activity wastes appear to be excessively conservative.

The invention obviates the above-mentioned drawbacks; it is a procedure to measure the radioactivity of radioactive materials enclosed in a container by means of γ ray detectors positioned laterally, outside the container and, comprises the following phases of:

i) weighing a known volume container in order to determine the average density of its content;

ii) positioning the container upon a support;

iii) positioning on respective supports two γ ray detectors set symmetrically compared to a main transversal axis of the container, facing the smaller walls of the container;

iv) vertically moving the container, so that its main longitudinal axis coincides with the axis connecting the two detectors;

v) moving the two detectors upon their respective supports in order to stop them in a sampling position, along said longitudinal axis, symmetrical with the container where the intensity of the radiation from the container is sampled in order to define the counting geometry;

vi) moving the two detectors upon their respective supports in order to stop them in a counting position symmetrical compared to the container, that proves to by suited to providing measurements of the radiations that are an optimum in terms of accuracy of the measurements and measurement time, the distance of such positions generally being greater than the largest dimensions of the walls of the container facing the detectors;

vii) measuring the γ radiation and calculating the geometric mean $(C1-C2)^{1/2}$, expressed as cps (counts per second), of the counting ratios (C1,C2) of the two detectors, such a geometric mean being linked to the intensity I of the corresponding γ radiation by the following formula $$(C1 \cdot C2)^{1/2} = I \cdot \beta \cdot F1 \cdot F2 \cdot (\alpha/D^2) \cdot \exp(-\mu^* \cdot L/2) \qquad (1)$$

when the activity is mainly concentrated in a limited area of the container, and alternatively by the formula $$(C1 \cdot C2)^{1/2} = I \cdot \beta \cdot F1 \cdot F2 \cdot (\alpha/D^2) \cdot (1-\exp(-\mu^* \cdot L))/(\mu^* \cdot L) \qquad (2)$$

when the activity is distributed in a sensibly uniform manner within the container;

viii) calculating the intensity I of the γ radiation by means of one of the above formulae.

It is understood that the container, generally in the form of a cylindrical drum, will be preferably positioned with its longitudinal axis horizontal so that each of the two circular walls faces one of the detectors. It is also understood that the positioning of the two detectors symmetrically compared to the main transversal axis of the container is not a compulsory condition; a non-symmetricall positioning only involves a greater complexity of the mathematical procedure.

In the above formulae: $\mu^* = (2/D) + \mu$ where $\mu$ is the mean attenuation coefficient for the material contained, expressed as cm⁻, I is the radiation intensity of the source, expressed as dps (disintegrations per seconds, or Bq), β is the branching of the γ line considered, F1 is the absorption factor of the container base, F2 is the absorption factor in air, α is a parameter expressed in $cm^{-2}$ that depends on the energy of the photons and on the characteristics of the detectors, but not on the distance between container and detector, nor on the dimensins of the container, or on the nature of the wastes; α is calculated from the values of $C_{(D1)}$ and $C_{(D2)}$ shown below, D is the distance between a detector and the wall of the container facing the detector, expressed in cm, including the distance covered on average by the photons inside the container (in practice D is the distance between said wall of the container and the cetre of the detector), L is the height of the container, expressed in cm.

The quantities $\beta$, D, L are known, while F2, very cose to 1, is calculated. The calibration of the apparatus hence requires the determining of $\alpha$ and F1 versus the energy.

To this purpose a series of measurements are performed by using one detector only and setting calibrated sources, grouped in various ways, outside an empty container, as close as possible to its walls opposite the detector, both walls being on one side of the detector and on the other (distances D1 and D2, are shown in FIG. 2).

At a given energy of the calibrated sources the counting ratios in cps in the two positions, one at a distance D1 and the other at a distance D2 from the detector, are expressed as:

$$C_{(D1)} = I \cdot \beta F2_{(D1)} \cdot \alpha / D1^2$$

$$C_{(D2)} = I \cdot \beta \cdot F1^2 \cdot F2_{(D2)} \cdot \alpha / D2^2$$

where $F2_{(D1)}$ and $F2_{(D2)}$ are the absorption factors in the air at the distances D1 and D2 from the detector, respectively.

The quantity F1 is obtained by:

$$F1 = ((C_{(D2)} \cdot D_2^2 \cdot F2_{(D1)}) / (C_{(D1)} \cdot D1^2 \cdot F2_{(D2)}))^{1/2},$$

and $\alpha$ is obtained by $$\alpha = (C_{(D1)} \cdot D1^2) / (I \cdot \beta F2_{(D1)}).$$

Because the chemical composition of the wastes is not known, also the value of the attenuation coefficient at a given energy required to calculate efficiency is not known.

However, within the energy interval involved in this type of measurement the attenuation coefficient at a given energy, expressed in cm$^2$/g, is sensibly independent from the atomic number. This leads to the ratio between attenuation coefficients of the two different substances, expressed in cm$^{-1}$, is roughly equal to the ratio between their densities.

It is therefore possible to adopt a conventional value for the attenuation coefficient, $\mu_{conv}$ that can be derived from the product of the water attenuation coefficient, expressed in cm$^2$/g, with the average density $\rho$ of the material gather in the containers:

$$\mu_{conv} = \mu(H_2O) \cdot \rho$$

The values of $\mu(H_2O)$ reported in literature are:
0.085, 0.066, 0.062 cm$^2$/g at 662, 1173, and 1332 keV respectively.

The main advantages of the procedure invented are that said geometric mean is sensibly independent from the distribution of the material within the container and that the procedure offers a good sensitivity and accuracy of measurements in every imaginable practical situation featuring non-homogeneous sources.

An optional detector of $\gamma$ radiations is made to slide parallel to the greater dimensions of the container in order to provide further information useful in deciding whether to choose formula (1) or formula (2).

The performances of the measurement technique described have been theoretically evaluated for all possible combinations of non-homogeneous materials and radioactivity within the containers. To carry out the procedure invented very simple apparatuses may be used, as can be fully automated ones both for the movement of the various parts (mainly containers and detectors) and for the detection and count of the radiations.

An example of embodiment of the invention that isn't simply the purely manual movement of the container and detectors, that is in fact to be avoided for the safety of personnel, is described below and comprises:

a) a supporting structure for a container associated to a positioning device suited to setting the container between two opposite detectors for $\gamma$ radiations and above a device suited to weighing the container in order to measure the average density of its contents;

b) a pair of supports for said detectors symmetrically positioned compared to the main axis of the container;

c) a motor organ controlled by a processor in order to produce equal and opposite translations of both detectors, in order to position the two detectors at a first distance from the detectors and perform a first count to gauge the radiation and hence re-position them at a second distance in which the radiation count is at an optimum both from an accuracy viewpoint and considering the time of measurement.

DESCRIPTION OF THE PREFERRED EMBODIMENT

Figure 1:
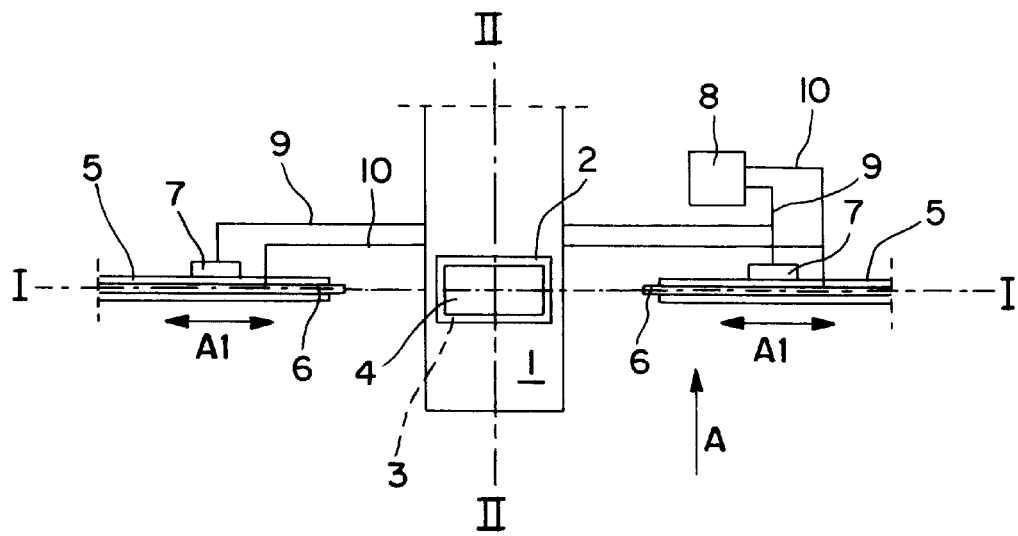
FIG. 1 is a plane view.
Figure 2:
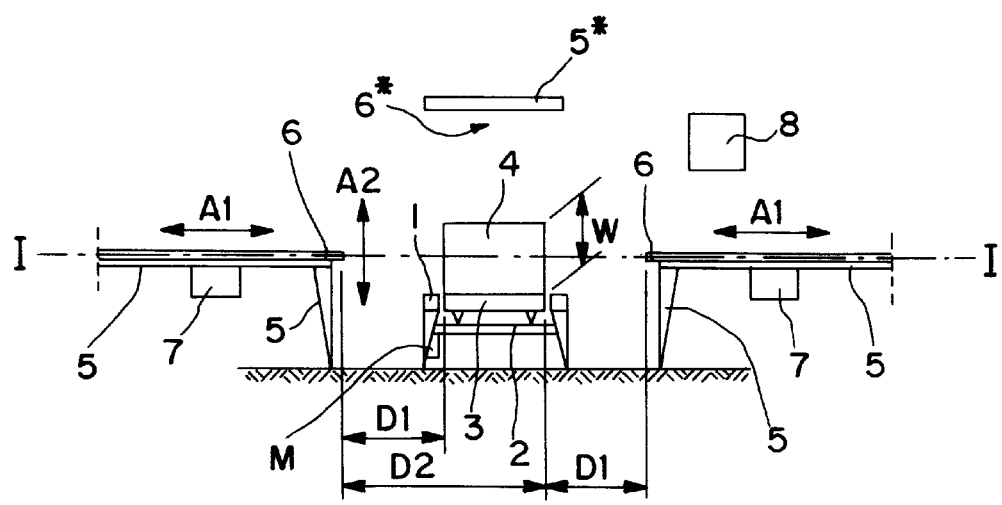
FIG. 2 is a front view, according to arrow A in FIG. 1.

FIGS. 1 and 2 together show a supporting structure 1 extended horizontally and bearing a loading plane 2 of a weighing device 3 suited to weighing a sealed drum 4; on each side of the structure 1 a horizontal support 5 is foreseen to bear a detector of $\gamma$ radiations, shown with 6, that a motor organ 7, controlled by a computer 8, longitudinally move along the two directions of arrow A1; a motor organ M also controlled by the computer 8 that vertically moves the loading plane 2, according to arrow A2, so that the longitudinal axis I—I of drum 4 coincides with that of detectors 6, the electric conductors 9 connect computer 8 to the motor organs 7 and M and the electric conductors 10 connect computer 8 with detectors 6 (in FIG. 2 the conductors are not shown); a third detector of $\gamma$ radiations 6*, positioned upon a support 5* positioned at a convenient distance from and above drum 4, also connected to computer 8 by means of a connector that is not shown, that is made to move in the directions of arrow A1 in order to provide data concerning the distribution of radioactivity within the container 4. In this example, the distance D1 at which the detectors 6 are positioned compared to drum 4, so as to operate according toe the procedure, is greater than the dimension W of the circular walls of the drum 4, as stated in the above paragraph vi), because this condition is essential to obtain the best results from the procedure. The computer 8 is programmed also to process the date supplied by the operator, gather the $\gamma$ spectrums and solve the formulae (1) and (2).

What is claimed is:

1. A procedure to measure the radioactivity of radioactive materials enclosed in a container (4) by means of $\gamma$ ray detectors (6) positioned laterally, outside the container, characterized in that comprises the following phases:

i) weighing a known volume container (4) in order to determine the average density of its contents;

ii) positioning the container (4) upon a support (1);

iii) positioning on respective supports (5) two γ ray detectors (6) set symmetrically compared to a main transversal axis (II—II) of the container, facing the smaller walls (W) of the container (4);

iv) moving (A2) the container (4), so that its main longitudinal axis coincides with the longitudinal axis (I—I) connecting the two detectors (6);

v) moving (A1) the two detectors (6) on their respective supports (5) in order to stop them in a sampling position, along said longitudinal axis (I—I), symmetrical with the container (4), where the intensity of the radiation from the container is sampled in order to define the counting geometry;

vi) moving (A1) the two detectors (6) upon their respective supports (5) in order to stop them in a counting position, along said longitudinal axis (I—I), symmetrical with the container (4), that proves to by suited to providing measurements of the radiations that are an optimum in terms of accuracy of the measurement and counting time, the distance(D1)of such positions generally being greater than the largest dimensions (W) of the walls of the container facing the detectors (6);

vii) measuring the γ radiation and calculation of the geometric mean, expressed as counts per second, of the counting ratios (C1,C2) of the two detectors (6), such a geometric mean being linked to the intensity of the corresponding γ radiation by the following formula $$(C1 \cdot C2)^{1/2} = I \cdot \beta \cdot F1 \cdot F2 \cdot (\alpha/D^2) \cdot \exp(-\mu^* \cdot L/2) \qquad (1)$$

when the activity is mainly concentrated in a limited area of the container, and alternatively by the formula $$(C1 \cdot C2)^{1/2} = I \cdot \beta \cdot F1 \cdot F2 \cdot (\alpha/D^2) \cdot (1-\exp(-\mu^* \cdot L))/(\mu^* \cdot L) \qquad (2)$$

when the activity is distributed in a sensibly uniform manner within the container;

viii) calculating the intensity I of the γ radiation by means of one of the above formulae, where $\mu^* = (2/D) + \mu(H_2O) \cdot \rho$, $\mu(H_2O)$ is the mean attenuation coefficient in the water, expressed in cm²/g, ρ is the average density, expressed in g/cm³, of the material gathered in the container (4), I is the intensity of the source, expressed in dps or Bq, β is the branching of the γ line considered, F1 is the absorption factor of the container base, F2 is the absorption factor in air, α is a calculated parameter expressed in cm⁻² that depends on the energy of the photons and on the characteristics of the detectors, D is the distance between a detector and the wall of the container facing the detector, expressed in cm, including the distance covered on average by the photons inside the container, L is the height of the container, expressed in cm.

2. A procedure according to claim 1 characterized in that a third γ ray detector (6*) is made to slide parallel to said longitudinal axis (I—I) of the container (4) at a distance therefrom so as to gather further information about radioactivity and made an operator decide whether to use one or the other of said formulae for calculating the geometric mean $(C1 \cdot C2)^{1/2}$.

\* \* \* \* \*

UNITED STATES PATENT AND TRADEMARK OFFICE
CERTIFICATE OF CORRECTION

PATENT NO.   : 6,407,394 B1
DATED        : June 18, 2002
INVENTOR(S)  : Borioli et al.

It is certified that error appears in the above-identified patent and that said Letters Patent is hereby corrected as shown below:

Column 6,
Line 34, after "formulae" insert -- [(1),(2)] --.

Signed and Sealed this

Fifteenth Day of October, 2002

Attest:

Attesting Officer

JAMES E. ROGAN
Director of the United States Patent and Trademark Office